Dec. 20, 1932.        R. G. FEAR        1,891,277

COMBINED PHOTOGRAPHIC CAMERA AND SOUND RECORDING APPARATUS

Filed Sept. 15, 1930

INVENTOR.
RALPH GORDON FEAR

BY
ATTORNEY

Patented Dec. 20, 1932

1,891,277

UNITED STATES PATENT OFFICE

RALPH GORDON FEAR, OF LOS ANGELES, CALIFORNIA

COMBINED PHOTOGRAPHIC CAMERA AND SOUND RECORDING APPARATUS

Application filed September 15, 1930. Serial No. 481,961.

My invention relates to kinetographic apparatus, and the like, which are used for photographing actions of performers, and recording of sound, by means of electrical impulses recorded on film, and more particularly to such apparatus wherein the picture may be photographed and the sound may be recorded simultaneously.

It is moreover an object of my invention to provide means or apparatus of such construction whereby one film may be fed through said apparatus photographing motion and whereby another film may be fed through said apparatus recording sound.

Another object of my invention is to provide said apparatus with two sets of film magazines, and the combination of driving means for said apparatus, also means for feeding, pulling and controlling speed of said magazine within said apparatus.

A further object of my invention is to provide said apparatus with picture photographing means, also with sound recording means wherein a picture may be photographed upon a film and the sound may be recorded upon another film simultaneously.

It is also within the province of my invention to provide said combined apparatus with centrally positioned driving means of such construction, whereby the motion picture camera driving means and the sound recording camera driving means may be operated separately and independently of each other.

By using two sets of films in said apparatus, the picture may be photographed upon a negative film and the sound recorded upon a positive film, resulting in considerable saving in cost of film, and operation.

In the construction as herein described, I have provided film sprocket wheels of adjustable structure, wherein a wide or narrow film may be fed through said apparatus; said sprocket wheel structure being covered by an application for patent filed August 25th, 1930, Serial Number 477,611.

The above and further objects and advantages of my invention, as will herein more fully appear, I attain by the construction described in the specification and illustrated on the drawing forming a part of my application.

Reference is had to the accompanying drawing in which similar reference characters denote similar parts.

Figure 1:
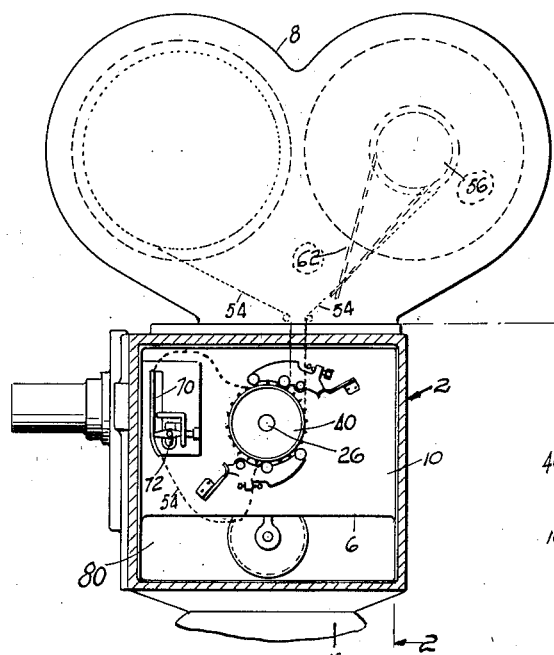
Fig. 1 is the side elevational view of the motion picture camera taken on the line 1—1 of the Fig. 2, showing the film passing through said camera aperture.
Figure 2:
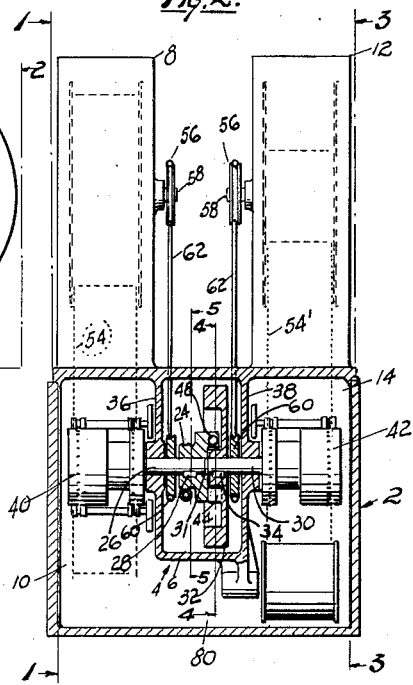
Fig. 2 is a cross sectional and elevational view, taken on the line 2—2 of Fig. 1, of said motion picture camera and the sound recording apparatus.
Figure 3:
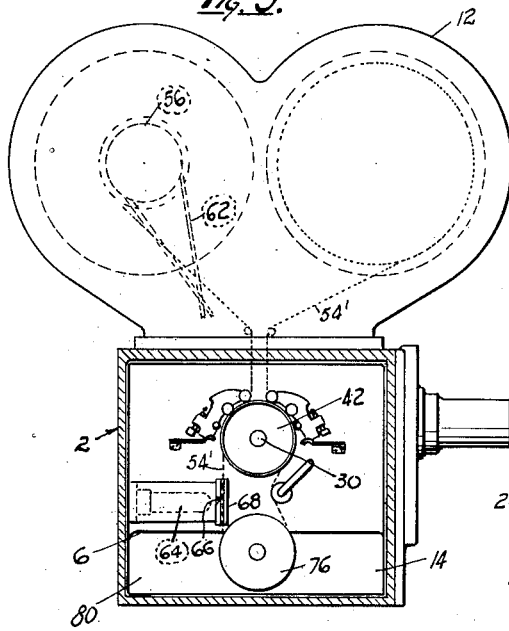
Fig. 3 is a side elevational view of the sound recording apparatus, taken on line 3—3 of the Fig. 2, showing the film passing through the sound recording aperture.
Figure 4:
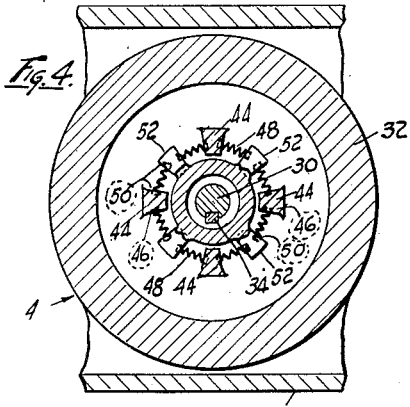
Fig. 4 is an enlarged sectional view, taken on the line 4—4 of the Fig. 2, showing the vibration absorbing means.
Figure 5:
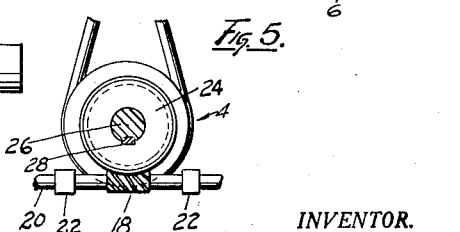
Fig. 5 is an enlarged sectional view, taken on the line 5—5 of the Fig. 2, showing driving means of said combined camera and apparatus.

Describing my invention more in detail in its broader aspects, my invention comprises the combined motion picture camera and sound recording apparatus generally designated by numeral 2, which is adapted to house a driving mechanism 4, in centrally positioned compartment 6, having a film magazine 8, substantially positioned upon said motion picture camera section 10 and having film magazine 12, substantially positioned upon said sound recording apparatus section 14, said structure 2 being substantially mounted in any preferred manner such as on tripod 16, or the like.

The driving mechanism 4, comprises suitable driving means such as worm 18, or the like, which is substantially mounted upon a shaft 20, supported within said compartment 6, by means of bearings 22, and adapted to drive a worm gear 24, which is substantially mounted upon a shaft 26, by means of a key 28, and coupled therein with a shaft 30, as at 31, upon which a fly wheel 32, is positioned by means of a key 34.

Said shafts 26 and 30 extend through the compartment wall 36, to motion picture camera section 10 and through the wall 38, to sound recording section 14. Substantially positioned upon said shaft 26 within said camera section 10 is a sprocket wheel 40. Also, positioned upon said shaft 30, within the sound recording section 14 is a sprocket wheel 42, purpose of which will be presently described.

Said fly wheel 32, is provided with a plurality of said protruding lugs 44, preferably multiple in number, having sockets 46 positioned on each side of said lugs to receive vibration absorbing yielding means, such as rubber pads or coil springs 48, extending over to the sockets 50, of the lugs 52, substantially positioned upon said worm gear 24, as shown.

The purpose of said yielding means 48, positioned between said lugs 44, of the fly wheel 32, and said lugs 52, of said worm gear 24, is to absorb any and all vibrations or speed irregularities which may occur while films 54 and $54^1$, are pulled from said film magazines 8 and 12, over the sprocket wheels 40 and 42, driven by said worm gear 24, and the fly wheel 32, respectively, thus maintaining constant and uniform speed at all times.

The film take-up means of said film magazines 8 and 12, may be conventional or one for each magazine, as herein described, comprising a pulley 56, mounted upon a shaft 58, driven by the driving pulley 60, which is substantially mounted upon said shaft 26, and 30 actuated by the driving belt 32, as shown.

To photograph or record sound upon said film $54^1$, I have illustrated a recording means such as light valve or recording tube 64, positioned in any preferred manner within said recording apparatus 14, and in close proximity to the light opening 66, of the aperture 68.

In operation:

In the motion picture camera, the film 54, passing from the film feeding magazine 8, passes in any manner preferred in practice to the section 10, over the sprocket wheel 40, to the camera aperture 70, wherein said film 54, is actuated by the intermittent means 72, passing again to said sprocket 40, and back to the magazine section 8.

In the sound recording apparatus, the film $54^1$, passing from the film feeding magazine 12, passes in any manner preferred in practice to the section 14; where said film is fed at constant speed by the sprocket wheel 42, passing through the sound recording aperture 64, and over the roller 76, to the sprocket wheel 42, returning to the magazine section 12.

The structure 2, as herein described is also provided with an opening 80, which is for the purpose that, in the event it is preferred to feed a film 54, from the magazine 8, through said compartment 10, and motion picture camera aperture 70, also sprocket wheel 40, said film may be deflected and fed through said opening 80 into the compartment 14, of said sound recording apparatus, feeding through the sprocket wheel 42, passing through said recording aperture 64, returning to the film magazine 12, substantially as described.

In accordance with the provisions of the patent statutes, I have described the principle of operation of my invention together with the apparatus which is now considered to represent the best embodiment thereof; but I desire to have it understood that the apparatus shown is only illustrative and that the invention can be carried out by other means and may be adaptable to any other film or films which may be fed through said apparatus, I accordingly do not propose to be limited to the exact details of construction as shown and described, but reserve the right in practice to make any and all modifications that may fall within the scope of the appended claims.

I claim as my invention:

1. In the apparatus of the class described including a motion picture camera and a sound recording apparatus, the combination of, an enclosure comprising a plurality of compartments for said motion picture camera and said sound recording apparatus having a plurality of film magazines connected thereto, a sound proof compartment centrally positioned within said enclosure and between said compartments therein, a driving mechanism positioned within said sound proof compartment, a drive shaft connected to said driving mechanism and protruding through the side walls of said sound proof compartment, means connected to said drive shaft whereby a picture film and sound recording film of varied widths may be fed through said apparatus simultaneously and vibration absorbing means connected to said drive shaft so that said driving mechanism irregularities may be rectified, while said apparatus is in operation.

2. In the apparatus of the class described, including a motion picture camera and a sound recording apparatus, in combination, an enclosure comprising a set of picture camera and sound recording compartments having a plurality of film magazines connected thereto, a sound proof compartment centrally positioned within said enclosure and between said compartments, said compartments having a passage opening underneath, a driving mechanism positioned within said sound proof compartment, a drive shaft connected to said driving mechanism and protruding through the side walls of said sound proof compartment, vibration absorbing means connected to said drive shaft so that said driving mechanism may be relieved from any objectionable irregularities in its operation, and means connected to the ends of said drive shaft adapted to feed a picture and sound recording film through one recording compartment, through the passage and into and through the other recording compartment.

In testimony whereof I have signed my name to this specification.

RALPH GORDON FEAR.